United States Patent [19]

Shimada

[11] Patent Number: 4,715,916

[45] Date of Patent: Dec. 29, 1987

[54] METHOD FOR ASSEMBLING A SEAT BACK

[75] Inventor: Makoto Shimada, Akishima, Japan

[73] Assignee: Tachikawa Spring Co., Ltd., Tokyo, Japan

[21] Appl. No.: 778,259

[22] Filed: Sep. 20, 1985

[30] Foreign Application Priority Data

Sep. 25, 1984 [JP] Japan .............................. 59-200893

[51] Int. Cl.$^4$ ............................................. B29B 43/04
[52] U.S. Cl. .................................... 156/245; 156/213;
156/214; 156/294; 156/303.1; 264/321;
297/452; 297/DIG. 1; 53/459; 53/526
[58] Field of Search ................ 156/160, 163, 196, 212,
156/213–214, 219, 242, 245, 303.1, 293, 294;
53/524, 526, 452, 459, 469; 264/321; 297/452,
DIG. 1

[56] References Cited

U.S. PATENT DOCUMENTS 3,713,697  1/1973  Koepke .......................... 297/DIG. 1
4,223,510  9/1980  Cash ...................................... 53/258

FOREIGN PATENT DOCUMENTS 56-63388  5/1981  Japan .

Primary Examiner—Donald E. Czaja
Assistant Examiner—Merrell C. Cashion, Jr.
Attorney, Agent, or Firm—Cushman, Darby & Cushman

[57] ABSTRACT

A method of assembling a seat back in an automotive seat is disclosed which comprises the steps: inserting a baggily sewn trim cover assembly into a lower mold; pressing an upper mold against the front surface of the trim cover assembly to emboss a predetermined configuration in the trim cover assembly; applying an adhesive agent to the embossed trim cover assembly; pressing a cushion member against the embossed trim cover assembly to bond thereto and, turning over the portions of the trim cover assembly which are not bonded to cover the cushion member.

3 Claims, 6 Drawing Figures

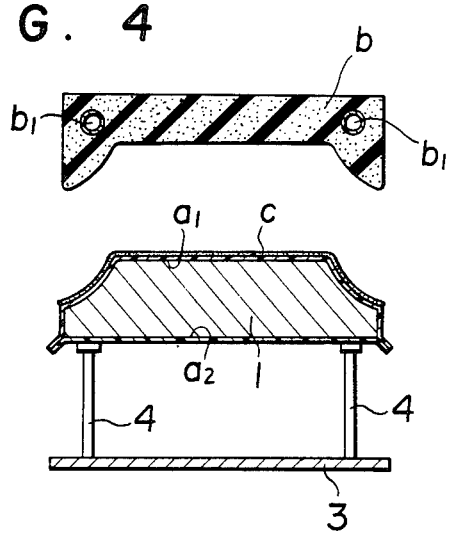
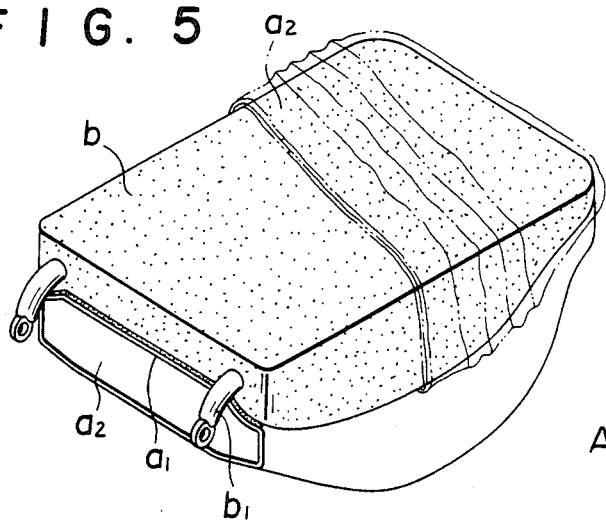
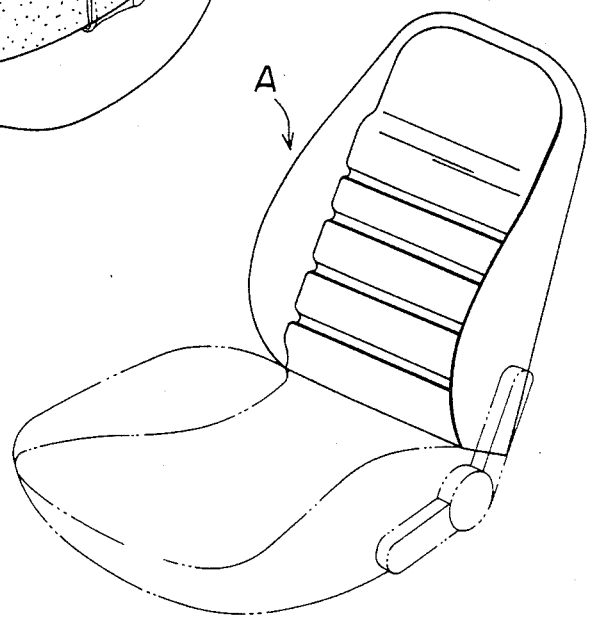

METHOD FOR ASSEMBLING A SEAT BACK

BACKGROUND OF THE INVENTION

1. Field of the Invention

The present invention relates to a method for assembling a seat back in an automotive seat and, more particularly, to a method for assembling a baggily sewn trim cover assembly to a foam cushion member formed by holding and provided with a frame embedded therein so as to form a seat back in an automotive seat.

2. Description of the Prior Art

Cnventionally, there has already been disclosed a method under the name of the present applicant (Japanese Patent Publication No. 63388 of 1981) in which a trim cover assembly is turned inside out and is then molded to be provided with a predetermined uneven (concavo-convex) configuration; an adhesive agent is applied to the molded trim cover assembly, in particular, to the main body thereof; a cushion member of a foam material is bonded onto the main body; and, thereafter the gore portions of the trim cover assembly which are not bonded are turned over so as to assemble a seat back.

This method has indeed several advantages over the other conventional methods. For example, in one of the conventional methods, a trim cover assembly is adsorped by vacuum to the inner wall of a mold and urethane is foamed inside thereof. In this case, if one of the trim cover assembly and urethane becomes defective, then the other also becomes defective. But, according to the disclosed new method, since the trim cover assembly is mounted by bonding to the cushion member, there is no possibility of the above-mentioned correspondingly resulting defects.

However, the disclosed method is disadvantageous in that it cannot be applied to a trim cover assembly which is formed in a bag-like form by integrally sewing to the gore of the trim cover assembly a back cloth forming the back side of a seat back, because it has a substantially cylindrical configuration.

SUMMARY OF THE INVENTION

Accordingly, it is a principal object of the invention to provide an improved method for assembling a seat back which can eliminate the drawbacks found in the above-mentioned prior art methods.

To achieve this object, the invention includes the steps of mounting a bag-like trim cover assembly to a lower mold which is provided on the upper surface thereof with an embossed or uneven (concavo-convex) configuration corresponding to the configuration of the front surface of the seat back and also which is supported cantileverwise, pressing and embossing the front surface of the trim cover assembly in a predetermined configuration, thereafter, applying an adhesive agent to the front surface of the trim cover assembly, pressing a foam cushion member against the adhesive-applied front surface to be bonded thereto, and turning over the back surface of the trim cover assembly which are not bonded to cover the cushion member so as to assemble the seat back.

Thus, according to the invention, since the trim cover assembly sewn in a bag-like configuration is bonded by adhesives to the cushion member and is turned over on the back surface side thereof to cover the cushion member, the seat back can be assembled more simple, resulting in the enhanced operationability.

Other objects and advantages of the invention will become apparent during the following discussion of the accompanying drawings.

BRIEF DESCRIPTION OF THE DRAWINGS

FIG. 4 is a side section view to illustrate how to bond a cushion member to the trim cover assembly;

FIG. 5 is a perspective view of the trim cover assembly and the cushion member, illustrating how to turn over the back side surface of the trim cover assembly to cover the bonded cushion member; and, FIG. 6 is a perspective view of a seat back constructed in accordance with the invention.

DETAILED DESCRIPTION OF A PREFERRED EMBODIMENT OF THE INVENTION

Figure 1:
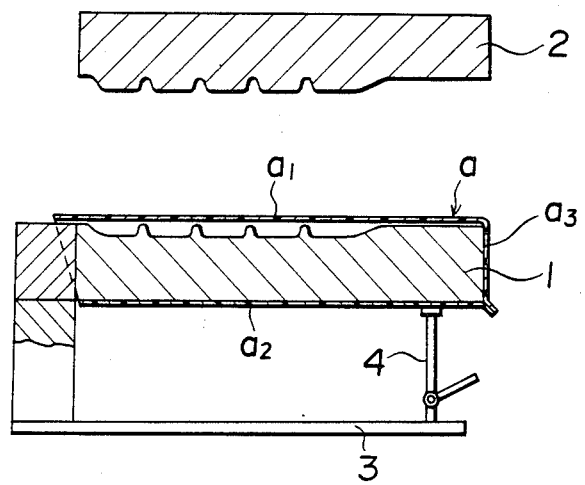
FIG. 1 is a section view to illustrate a state in which a trim cover assembly is mounted onto a lower mold.

Referring first to FIG. 1, there is illustrated a state in which a bag-like sewn trim cover assembly (a) is mounted into a lower mold (1) and unevern (concavo-convex) configurations are embossed on the front surface side (main body, side cover)(a1 ) of the trim cover assembly (a) so as to improve the appearance of a seat back as well as the holding characteristics thereof. The lower mold (1) is supported on a pedestal (3) cantileverwise and is provided on the upper surface there-of with an uneven configuration for embossment. In other words, the bag-like trim cover assembly (a) is turned over and is then inserted into the lower mold (1). Thereafter, the lower mold (1) is supported by a prop (4). In the drawings, (a2) designates the back surface side of the trim cover assembly (a) which forms the back portion of the seat back, (a3) represents a gore of the trim cover assembly (a), and (2) stands for an upper mold.

Figure 2:
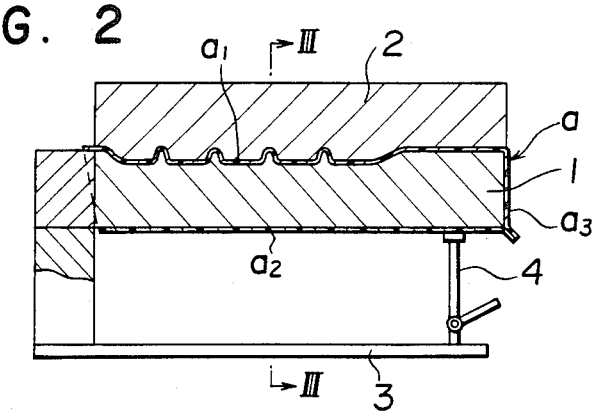
FIG. 2 is a side section view to illustrate how to emboss the trim cover assembly.
Figure 3:
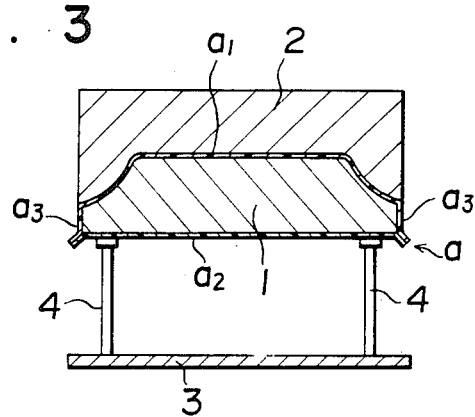
FIG. 3 is also a side section view to illustrate how to emboss the trim cover assembly.

Referring now to FIGS. 2 and 3, there is illustrated a state in which the upper mold (2) is pressed against the front surface side (a1) of the trim cover assembly (a) to emboss an uneven (concavo-convex) configuration on the front surface side (a1) of the trim cover assembly (a). The trim cover assembly (a) is formed of an elastic material such as vinyl chloride so that the cloth thereof may not be damaged during such embossment.

After the trim cover assembly (a) is embossed, an adhesive (preferably, a urethane adhesive which retains air-permeability after bonding) (c) is applied to the front surface side of the trim cover assembly (a) partially or wholly thereof (FIG. 4). Next, a cushion member (b) formed of a foam material and molded previously in a predetermined configuration is pressed against the adhesive-applied surface by a press or the like to be bonded thereto (FIG. 5).

The cushion member (b) includes reinforcing members such as zigzag (S) springs (not shown) therein.

After the cushion member (b) is pressed and bonded to the front surface of the trim cover assembly (a) attached to the lower mold (1), the prop (4) is removed from the lower mold (1) and then the back surface (a portion not bonded) of the trim cover assembly (a) is turned over (as shown by two-dot chained lines in FIG. 5) to cover the back portion of the cushion member (b). After covering the cushion member (b), the opened portions of the trim cover assembly (a) (the lower-most end portions of the seat back) covering the cushion member (b) are secured by hog rings or the like to be closed, so that a seat back (A) shown in FIG. 6 is formed. In turning over the above-mentioned trim cover assembly (a) to cover the cushion member (b), when it is difficult to turn over the trim cover assembly (a) because the cushion member (b) is too great in height, the trim cover assembly (a) may be arbitrarily provided with a fastener or the like which is free to open and close.

As described hereinbefore, after the bag-like sewn trim cover assembly for the seat back is inserted to the cantileverwise supported lower mold and is then embossed by pressure, the cushion member is bonded to the trim cover assembly and the unbonded portions of the trim cover assembly are turned over to cover the cushion member so as to form the seat back. Accordingly, a deep bag-like trim cover assembly can be used and thus such trim cover assembly is able to cover the cushion member for the seat back after the cushion member is bonded to the trim cover assembly, which eliminates the drawbacks found in the above-mentioned prior art seat back.

What is claimed is:

1. A method of assembling a seat back, comprising the steps of:

forming a bag-like trim cover assembly by sewing at least a cover portion defining front and lateral side portions of the seat back to a cover portion defining a back portion of the seat back;

mounting said bag-like trim cover assembly, inside out, onto a cantileverwise supported lower mold in an inserted manner, said lower mold being provided on the upper surface thereof with an uneven configuration corresponding to a desired front surface of the seat back;

pressing an upper mold having on the engagement surface thereof an uneven configuration corresponding to said uneven configuration of said lower mold onto said trim cover assembly so as to form an uneven surface on said trim cover assembly;

applying an adhesive agent to said uneven surface of said trim cover assembly;

pressing a foam cushion member with a frame embedded therein against said trim cover assembly while said trim cover assembly is mounted on said lower mold, to thereby bond said cushion member to said trim cover assembly; and turning over the portions of said trim cover assembly which are disposed on the lower surface side of said lower mold so that said portions cover said cushion member.

2. A method according to claim 1, wherein said step of forming comprises forming a bag-like trim cover assembly by sewing portions made from elastic material.

3. A method according to claim 1, wherein said step of pressing comprises pressing a foam cushion member which includes a pipe frame and a reinforcing member disposed therein.

* * * * *